Aug. 22, 1944.　　　　C. R. PATON　　　　2,356,424
WINDSHIELD WIPER
Filed Sept. 13, 1941　　　2 Sheets-Sheet 1
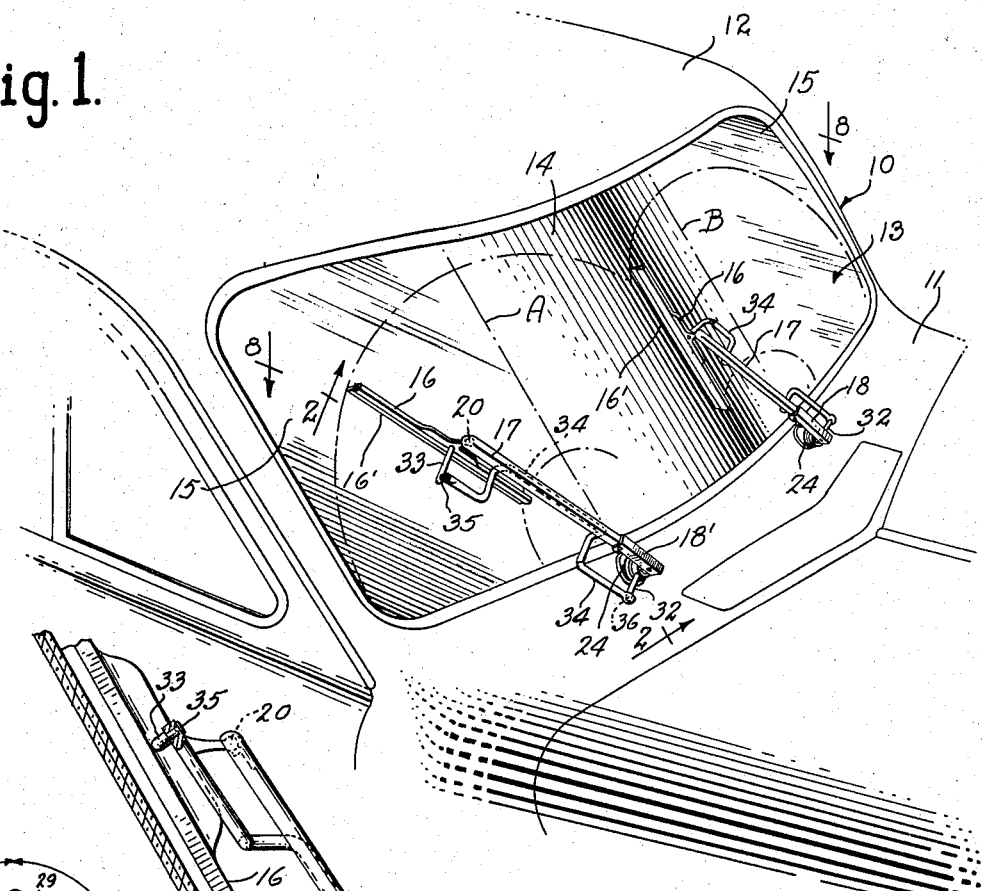
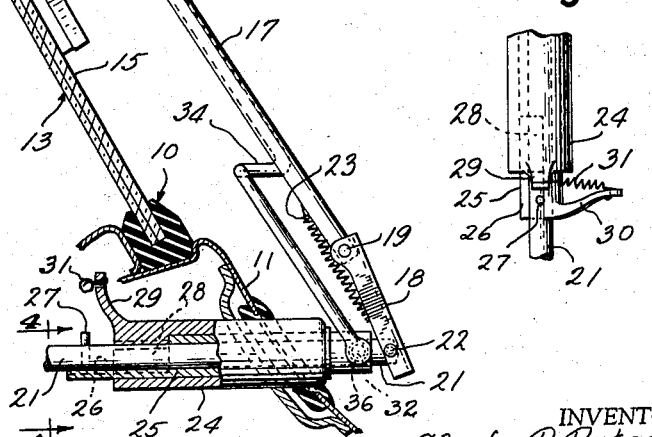
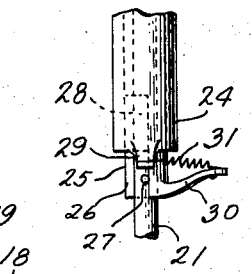
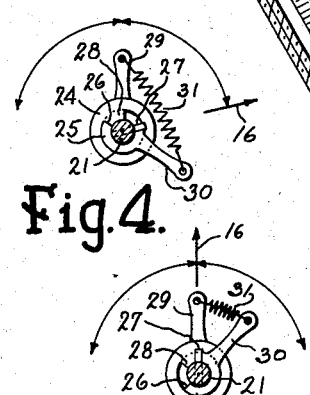
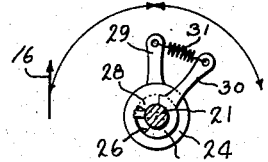
INVENTOR.
Clyde R. Paton
BY Tibbetts & Hart
Attorneys.

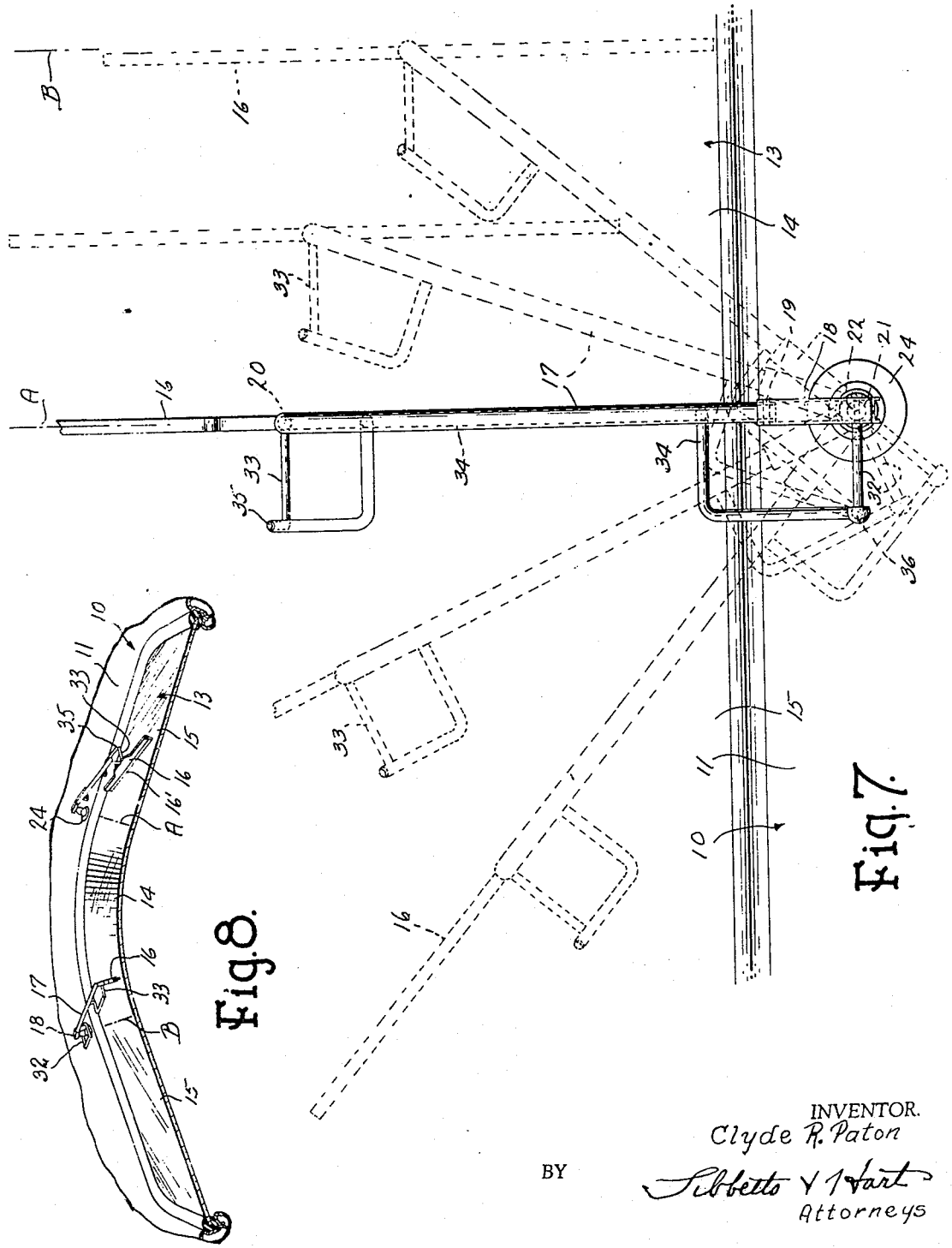

Patented Aug. 22, 1944

2,356,424

UNITED STATES PATENT OFFICE 2,356,424

WINDSHIELD WIPER

Clyde R. Paton, Birmingham, Mich., assignor to Packard Motor Car Company, Detroit, Mich., a corporation of Michigan Application September 13, 1941, Serial No. 410,721

9 Claims. (Cl. 15—255)

This invention relates to wiping devices for windows and windshields.

One type of wiper now in use consists of a surface contacting blade carried by an arm that is oscillated in an arcuate path by some form of power means. When the surface is in one plane, no difficulty is encountered in maintaining full contact of the blade throughout its path of movement. Some of the windshields and windows now proposed for motor vehicles are curved or have flat side portions with an intermediate curved portion and only a portion of the blade of the oscillating wiper previously employed will contact such curved surfaces.

It is an object of this invention to provide an oscillating wiping device that will operate efficiently over a curved surface.

Another object of the invention is to provide a wiping device in which a blade can be oscillated in full contact with a surface lying in more than one plane.

Another object of the invention is to provide a wiping device in which an oscillating wiping blade is maintained parallel to vertical straight lines of a curved window surface over which it is oscillated.

Other objects of the invention will appear from the following description taken in connection with the drawings, which form a part of this specification, in which:

Fig. 1 is a perspective view of a front portion of a motor vehicle containing the windshield and wiper devices incorporating the invention;

Fig. 2 is a vertical sectional view taken substantially on line 2—2 of Fig. 1;

Fig. 3 is a plan view of a portion of the operating mechanism for the wiping device shown in Fig. 2;

Figs. 4, 5 and 6 are similar sectional views of the actuating mechanism taken on line 4—4 of Fig. 2;

Fig. 7 is a front elevational view of one of the wiping devices shown in various positions in its path of travel;

Fig. 8 is a sectional elevational view taken substantially on line 8—8 of Fig. 1.

Referring to the drawings by characters of reference, 10 indicates a motor vehicle of conventional type having a cowl 11, a roof 12, and a glass windshield 13 between the cowl and the roof. The windshield glass is shown formed with a transversely curved or bowed central portion 14 and with flat side portions 15, the bowed portion extending between dotted lines A and B, as seen in Figs. 1, 7 and 8. The windshield slopes rearwardly from the bottom to the top and the curved portion is in the form of a portion of a cylinder so that vertical lines thereon will be straight.

A pair of similar devices are arranged to wipe the front surface of the windshield to clean paths in front of occupants of the vehicle. Such paths each extend over flat and curved portions of the windshield surface and the devices are arranged to efficiently wipe such surface portions.

As the devices are similar, a description of one will suffice for both. In each wiping device there is a blade consisting of a frame 16 supporting a rubber wiping element 16' having a straight edge that contacts the outer surface of the windshield. This blade is reciprocated in an arcuate path by actuator mechanism that includes an arm formed of channel sections 17 and 18 secured together by a pivotal connection 19. The section 17 is connected to the blade frame by pivot 20 and the section 18 is connected to shaft 21 by fastening means 22. The shaft can be oscillated in a conventional manner by any suitable power mechanism (not shown). The blade is urged against the windshield surface by pressure means in the form of a coil spring 23 having its ends attached to the sections of the arm. The shaft extends through a cylindrical bearing member 24 that projects through and is fixed stationary to the cowl.

The angular relation of the blade to the actuator arm is controlled by means operated in conjunction with the shaft. A sleeve 25 extends through the cylindrical bearing and has a slot 26 in the rear portion into which a driver pin 27, fixed to shaft 21, extends. A stop member 28, in the form of a boss on the fixed bearing, projects into the slot in the sleeve to limit the rotational movement of the sleeve. An arm 29 projects from the rear end of the bearing and an arm 30 projects from the sleeve adjacent the rear end of the bearing. Coil spring 31 is connected at its ends to arms 29 and 30. Arm 32 is fixed to and projects from the forward end of sleeve 25 and an arm 33 is fixed to and projects from the blade frame. These arms 32 and 33 are held parallel by link 34 pivoted at 35 to arm 33 and at 36 to arm 32. The arms 32 and 33, link 34 and the sectional actuator blade arm form a parallelogram linkage mechanism for operating the blade.

When pin 27 engages sleeve 25, as viewed in Fig. 5, and shaft 21 is rotated in a clockwise direction to the position shown in Fig. 4 it will drive the sleeve therewith so that the blade arm and the linkage fixed to the sleeve will move as a unit. When the pin 27 is moving in a counterclockwise direction between the positions shown in Figs. 4 and 5, spring 31 holds the sleeve in contact with the pin so that they rotate together. During such movement of the sleeve the wiper blade will be stationary with the arm as shown in full lines in Fig. 7 while traversing the flat portion of the windshield surface over which it is oscillated. While the shaft is oscillating between the positions shown in Figs. 5 and 6, the sleeve will be held stationary by boss 28 and the pin 27 will be free to move in the sleeve slot 25. With the sleeve held stationary, pivot 36 is held stationary and oscillation of the blade arm will cause shifting of the parallelogram linkage to shift the angular relation of the wiper blade and frame relative to the actuator arm. This angular shifting of the blade occurs while moving over the curved surface portion of the windshield between lines A and B in Figs. 1, 7 and 8. The blade will be rotated on its pivot 20 so that the edge remains parallel to vertical straight lines on the curved surface portion of the windshield. Thus, the blade travels in an arcuate path and the wiping edge will fully contact the windshield flat and curved surface portions during the entire oscillatory movement.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A device for wiping a windshield having a surface with flat and curved portions in a transverse direction comprising a wiper blade having an edge portion contacting the windshield surface, an arm pivoted, a universal joint pivotally connecting the arm to the blade, said arm being operable to reciprocate said blade in an arcuate path across the flat and curved portion of said windshield surface, and means operating to swing said blade on its pivot to hold the contacting edge portion thereof parallel to vertical lines on the windshield surface while passing across the curved surface portion thereof and constraining said arm and blade to move together in fixed relation while passing across the flat surface portion of the windshield surface.

2. A device for wiping a windshield surface having curved and flat portions in a transverse direction comprising a wiper blade contacting said surface, a drive shaft adapted to be oscillated, an arm fixed to oscillate with the shaft, means including a universal joint connecting to the wiper blade, and means holding the wiper blade in fixed relation with the arm while moving across the flat surface portion of the windshield and shifting the pivotal relation of the wiper blade relative to the arm while moving across the curved surface portion of the windshield to maintain the blade parallel to straight lines on the curved surface portion of the windshield.

3. A device for wiping a windshield surface having curved and flat portions in a transverse direction comprising a blade having a straight edge wiper portion adapted to be moved across the curved and flat portions of the windshield surface, parallelogram linkage including two parallel members pivotally connected to the blade, means operative to oscillate said linkage in an arcuate path, means operative to shift said parallel members of the linkage relatively while moving the blade over the curved portion of the windshield surface to maintain the blade edge portions parallel to straight lines on the curved surface portion of the windshield while passing thereover, and means holding said parallel members from relative movement while the blade is passing over the flat surface portion of the windshield.

4. A device for wiping a windshield surface having curved and flat portions in a transverse direction comprising a blade having a wiping edge, a jointed sectional arm pivotally connected at one end to the blade, journalled oscillating means connected with the other end of the arm for moving said blade in an arcuate path across said surface portions, a spring connected with sections of the arm and exerting pressure to hold the wiping edge of the blade against the windshield surface, and means operative to shift said blade on its pivot while traversing the curved portion of the windshield surface and thereby maintain the blade edge portion parallel to straight lines on the curved surface and to fix the blade and the arm relatively while traversing the flat portion of the windshield surface.

5. A device for wiping a windshield surface having curved and flat portions in a transverse direction, comprising a blade having a straight wiping edge, a jointed sectional arm pivotally connected at one end to the blade, a shaft connected to the other end of the arm and adapted to be oscillated, a spring connecting said arm sections in relation holding said blade against the windshield surface, and means for shifting the relation of the blade to the arm while moving over the curved surface portion of the windshield to maintain the wiping edge of the blade parallel to straight lines on the curved surface portion and for holding the blade and arm in fixed relation while traversing the flat portion of the windshield surface.

6. A device for wiping a windshield surface having curved and flat portions in a transverse direction comprising a blade having a straight wiping edge, an arm pivoted at one end to the blade, a shaft connected to the other end of the arm, an anchored bearing in which the shaft can oscillate to reciprocate the arm and blade in an arcuate path, a sleeve extending through the bearing, means for moving the sleeve with the shaft, stop means engaged by the sleeve during a portion of the shaft oscillation, and linkage connecting the sleeve with the blade, said linkage moving with the arm when the sleeve is free while the blade is passing over the straight windshield surface portion and shifting relative to said arm when the sleeve is stopped and the blade is passing over the curved windshield surface portion and thereby maintaining the blade wiping edge parallel to straight lines on the curved surface portion.

7. A device for wiping a windshield surface having curved and flat portions in a transverse direction comprising a blade having a straight wiping edge in contact with the windshield surface, arm means on which the blade is pivoted, actuator mechanism operative to oscillate said arm means in an arcuate path across said surfaces, means connected to said blade and movable bodily with the mechanism during travel of the blade over the flat portion of the windshield surface to hold the blade in fixed relation with the arm, and means holding said means stationary relative to the blade during travel of the blade over the curved portion of the windshield surface to shift the position of the blade and maintain the blade wiping edge parallel to straight lines on the curved surface.

8. A device for wiping a windshield surface having curved and flat surface portions in a transverse direction comprising a blade having a straight wiping edge contacting the surface, an actuator arm having pivoted together sections, a shaft adapted to be oscillated, one of said arm sections being pivoted to said blade and the other arm section being fixed to oscillate with said shaft, a spring connecting said sections and urging the blade arm section toward the windshield surface, an anchored bearing through which the shaft extends having an inwardly extending stop element, a sleeve extending through the bearing around the shaft, said sleeve having a slot therein into which the stop element projects, spring means connecting the sleeve with the bearing and urging rotation of the sleeve to engage one terminal of the slot against the stop element, a driving pin fixed to said shaft and extending into the slot in said sleeve, said pin driving said sleeve with said shaft except when traversing the slot, and link means connecting the sleeve with the wiper blade, said link means causing the blade to shift angularly relative to the arm while the sleeve is held stationary by the stop element.

9. A device for wiping a windshield surface having curved and flat portions in a transverse direction comprising a blade having a straight edge wiper portion for contacting the windshield surface, an arm pivoted at one end to the blade, a shaft pivoted to the other end of the arm and adapted to oscillate the blade across the curved and flat portions of the windshield surface, a link parallel to the arm having an end pivotally connected to the blade, a sleeve concentric with the shaft to which the other end of the link is pivoted, and means coacting with said shaft and sleeve holding the arm and link in the one relation while the blade is passing over the flat portion of the windshield surface and shifting the link relative to the arm to shift the blade into parallel relation to vertical lines on the windshield curved surface when passing thereover.

CLYDE R. PATON.

CERTIFICATE OF CORRECTION.

Patent No. 2,356,424.   August 22, 1944.

CLYDE R. PATON.

It is hereby certified that error appears in the printed specification of the above numbered patent requiring correction as follows: Page 2, first column, line 41, claim 1, after "arm" strike out "pivoted"; line 58, claim 2, after the word "connecting" insert --the arm--; and that the said Letters Patent should be read with this correction therein that the same may conform to the record of the case in the Patent Office.

Signed and sealed this 14th day of November, A. D. 1944.

Leslie Frazer (Seal)   Acting Commissioner of Patents.